United States Patent [19]

Burgess et al.

[11] 4,235,669
[45] Nov. 25, 1980

[54] NUCLEAR REACTOR COMPOSITE FUEL ASSEMBLY

[75] Inventors: Donn M. Burgess, Richland; Duane R. Marr, West Richland; Michael W. Cappiello; Ronald P. Omberg, both of Richland, all of Wash.

[73] Assignee: The United States of America as represented by the United States Department of Energy, Washington, D.C.

[21] Appl. No.: 891,673

[22] Filed: Mar. 30, 1978

[51] Int. Cl.² .............................................. G21C 3/04
[52] U.S. Cl. .......................................... 176/18; 176/78
[58] Field of Search ...................... 176/17, 18, 40, 84, 176/76, 78, 93 BP, 81

[56] References Cited

U.S. PATENT DOCUMENTS

| | | | |
|---|---|---|---|
| 2,961,393 | 11/1960 | Monson | 176/78 |
| 2,992,174 | 7/1961 | Edlund et al. | 176/18 |
| 3,042,598 | 7/1962 | Crowther | 176/93 BP |
| 3,049,484 | 8/1962 | Zinn | 176/93 BP |
| 3,081,247 | 3/1963 | Balent | 176/84 |
| 3,211,621 | 10/1965 | Creagan | 176/78 |
| 3,247,070 | 4/1966 | Challender et al. | 176/84 |
| 3,314,859 | 4/1967 | Anthony et al. | 176/93 BP |
| 3,366,546 | 1/1968 | Anthony et al. | 176/78 |
| 3,366,546 | 1/1968 | Anthony et al. | 176/78 |
| 3,427,220 | 2/1969 | Rennie et al. | 176/18 |
| 3,481,832 | 12/1969 | Rickert | 176/78 |
| 3,629,066 | 12/1971 | Anderson et al. | 176/81 |
| 3,844,886 | 10/1974 | Crowther | 176/17 |
| 3,891,502 | 6/1975 | Hackstein et al. | 176/84 |
| 3,974,028 | 8/1976 | Wheeler | 176/84 |
| 4,003,787 | 1/1977 | Marmonier et al. | 176/78 |
| 4,059,484 | 11/1977 | Bupp et al. | 176/78 |

FOREIGN PATENT DOCUMENTS 1000780 8/1965 United Kingdom ...................... 176/18

Primary Examiner—Harvey E. Behrend
Attorney, Agent, or Firm—Edward L. Levine; Z. L. Dermer

[57] ABSTRACT

A core and composite fuel assembly for a liquid-cooled breeder nuclear reactor including a plurality of elongated coextending driver and breeder fuel elements arranged to form a generally polygonal bundle within a thin-walled duct. The breeder elements are larger in cross section than the driver elements, and each breeder element is laterally bounded by a number of the driver elements. Each driver element further includes structure for spacing the driver elements from adjacent fuel elements and, where adjacent, the thin-walled duct. A core made up of the fuel elements can advantageously include fissile fuel of only one enrichment, while varying the effective enrichment of any given assembly or core region, merely by varying the relative number and size of the driver and breeder elements.

1 Claim, 5 Drawing Figures

NUCLEAR REACTOR COMPOSITE FUEL ASSEMBLY

BACKGROUND OF THE INVENTION

The invention described herein was made in the course of, or under, a contract with the United States Department of Energy.

FIELD OF THE INVENTION

This invention relates to nuclear reactors, and more particularly provides a fuel assembly and core for liquid-cooled breeder nuclear reactors.

DESCRIPTION OF THE PRIOR ART

Fuel assembly and core designs for breeder-type nuclear reactors have typically included two major types. The first, a homogeneous arrangement, includes a plurality of fissile fueled assemblies radially and axially surrounded by a breeder or fertile fueled zone. The fissile fueled internal portion of such cores must incorporate several fuel enrichment zones to achieve an acceptable radial power profile. This type of arrangement has typically required multiple complex structures, such as orifices, for controlling flow through the various zones to maintain a manageable thermal and hydraulic balance throughout the reactor core region.

The second type, or heterogeneous core, includes alternate columns of fertile and fissile fueled assemblies in a prearranged checkerboard array. Neutronic analyses have shown that such heterogeneous core arrangements will result in improved breeding gains and a reduced doubling time. However, such arrays include deficiencies, none the least of which are the differing heat rates between the fertile and fissile assemblies during the life of the core. Such differing heat rates can produce high thermal differentials which require stringent mechanical core constraints. Differing fissile fuel enrichments among the array regions may also be required.

A third type of core arrangement has also been proposed for other reactor types, which includes fertile and fissile fuel elements within the same fuel assembly. Such arrangements are specifically based upon varying fissile fuel enrichments within the assembly. Fuel elements of multiple enrichments are costly in terms of manufacturing first cost and also quality control and fuel management throughout the life of the fuel. They also prove difficult in maintaining a relatively uniform power distribution and core reactivity throughout fuel life, as well as requiring the aforementioned complex control structures.

It is therefore desirable to provide a fuel assembly and core for a liquid-cooled breeder nuclear reactor which reduces these deficiencies while maintaining a relatively high breeding ratio and low doubling time.

SUMMARY OF THE INVENTION

This invention provides a nuclear fuel element and core which does reduce the above-discussed deficiencies and which is compatible with use of a single fissile fuel enrichment throughout the core. It includes a composite fuel assembly having a plurality of vertical, parallel and co-extending elongated fuel elements including both fertile fueled breeder elements and fissile fueled driver elements arranged in a bundle to form the fuel assembly. The fuel elements are preferably arranged within a thin-walled metallic duct through which the liquid coolant flows. The fuel elements are preferably cylindrical, and each breeder element is of larger diameter than the driver elements. Each breeder element is also laterally surrounded by a plurality of the driver elements. Each of the driver elements includes structure for spacing the driver elements from each other and from any adjacent breeder elements or walls of the thin-walled metallic duct. The breeder elements are laterally supported by the driver element spacing structures. A core having such assemblies need include only one fissile fuel enrichment to maintain a relatively uniform radial power distribution, by varying the size or number of breeder elements within various assemblies, thus modifying the effective assembly enrichment.

The inventive fuel assembly and core can beneficially provide a more uniform thermal distribution through each assembly and through the core than previously obtainable. It can also reduce the number of varying thermal and hydraulic control mechanisms such as orifices, reduce stresses on the fuel assemblies such as those imposed by thermally induced bowing, and therefore also provide less severe design requirements for other core structural members.

BRIEF DESCRIPTION OF THE DRAWINGS

The advantages, nature and additional features of the invention will become more apparent from the following description, taken in connection with the accompanying drawings, in which.

DESCRIPTION OF THE PREFERRED EMBODIMENTS

Figure 1:
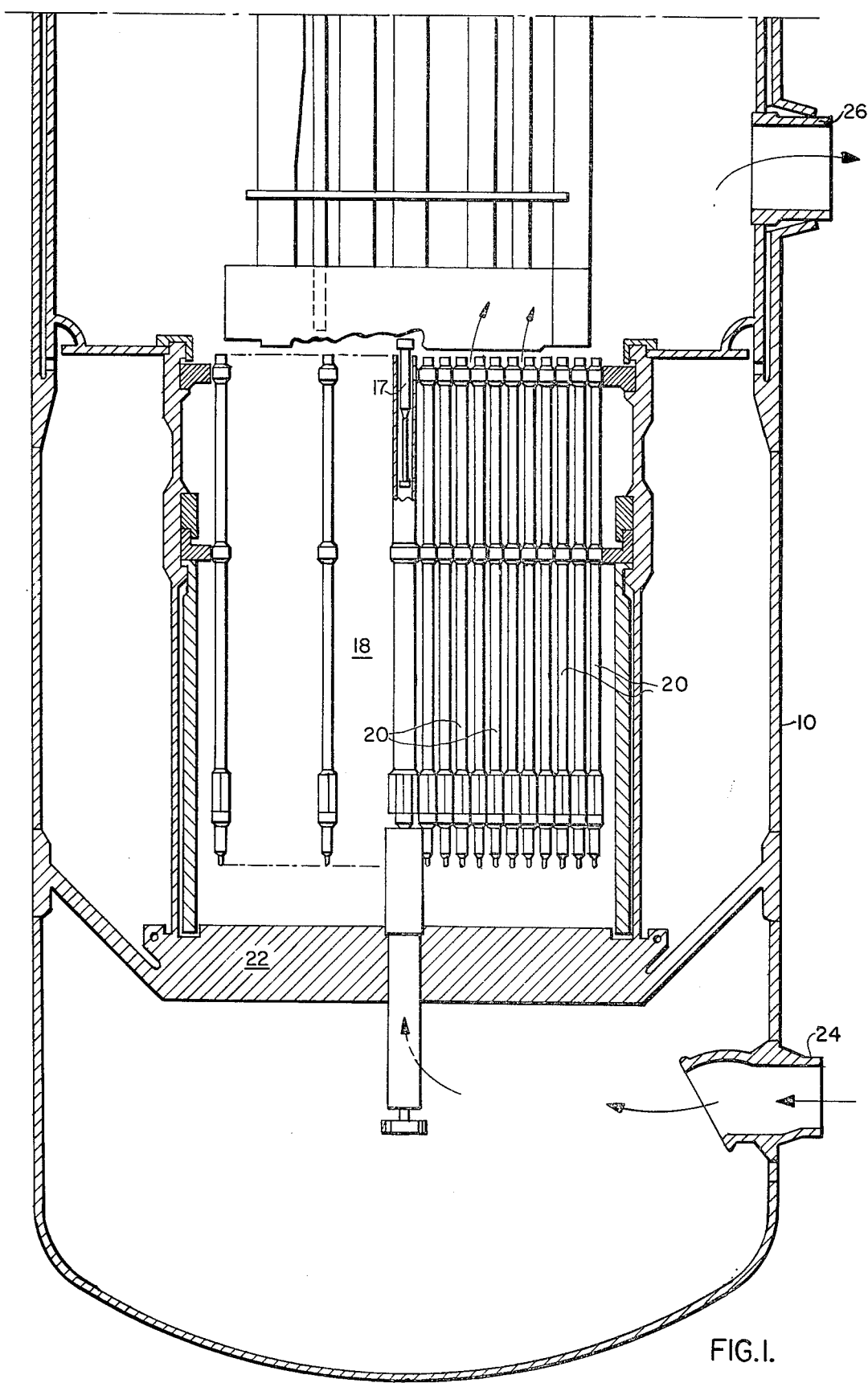
FIG. 1 is an elevation view, in cross section, of a typical nuclear reactor vessel and internal components.

Referring now to FIG. 1 there is shown partially an exemplary liquid-cooled breeder nuclear reactor of a type to which this invention can advantageously be applied. The reactor includes a pressure vessel 10 having a sealed head including rotating plug members and various penetrations (not shown). The penetrations allow for passage of components such as control rod elements 17 and refueling equipment. Disposed within the vessel 10 is a core 18 including a plurality of vertical, coextending fuel assemblies 20 having predetermined quantities and arrangements of fertile and fissile fuel as discussed hereinafter. The assemblies are supported by a lower internals structure 22, and are typically arranged to approach the configuration of a right circular cylinder. A liquid reactor coolant, such as those including sodium or potassium, enters the vessel through an inlet nozzle 24, passes upwardly through the core, and is discharged through an outlet nozzle 26 to heat exchange or other apparatus typically for the purpose of production of electrical energy.

Figure 2:
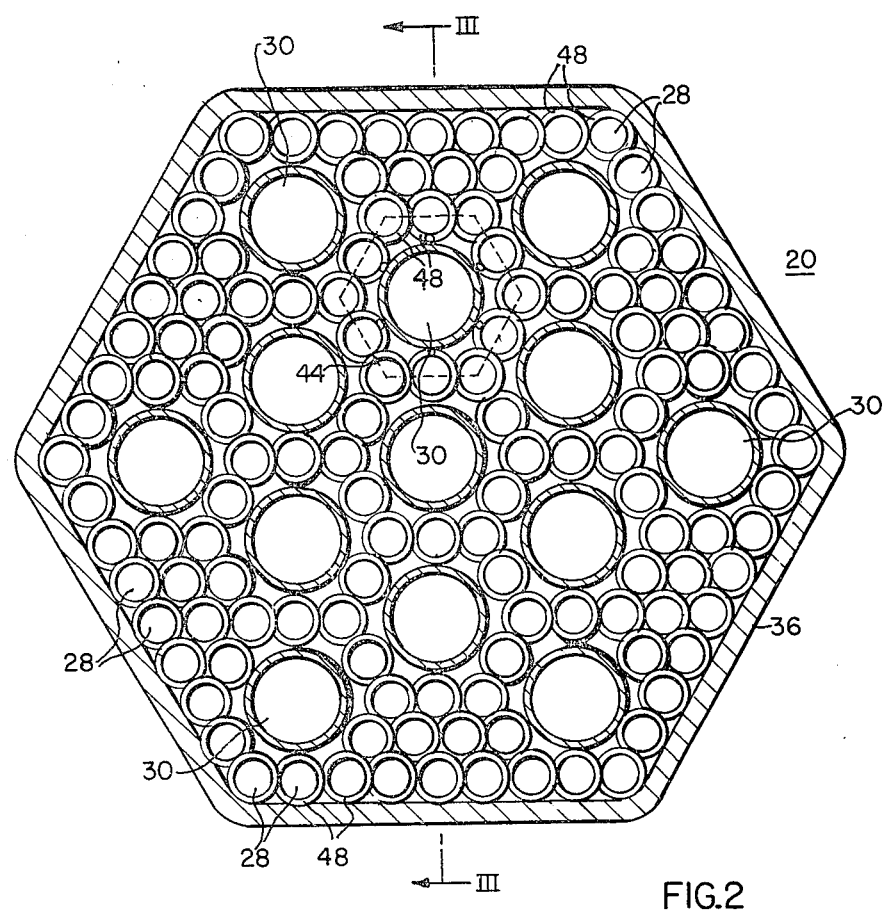
FIG. 2 is a plan view, in partial cross section, of an embodiment of a composite fuel assembly in accordance with this invention.
Figure 3:
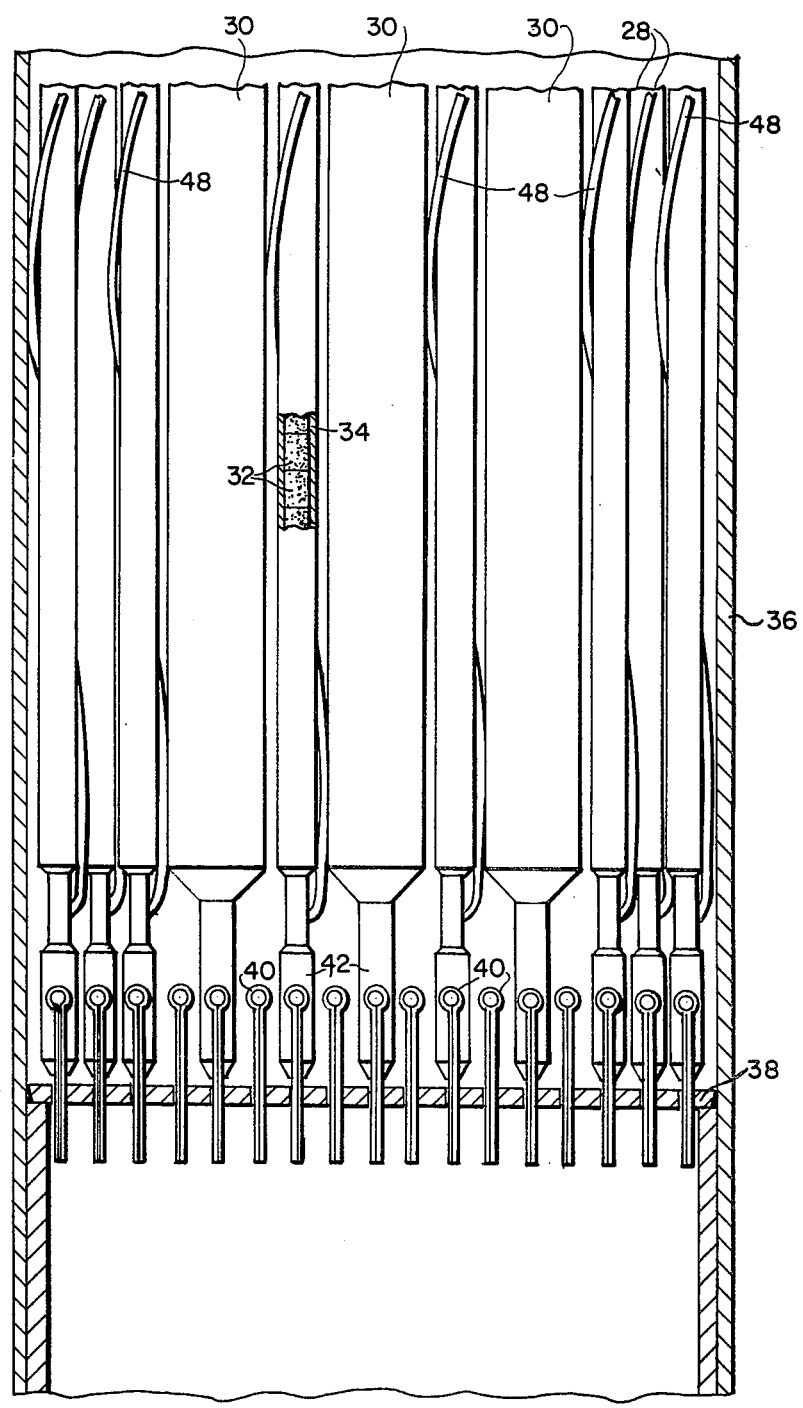
FIG. 3 is an elevation view, in cross section, taken at III—III of FIG. 2.

Additional detail of one embodiment of a composite fuel assembly 20 in accordance with this invention is shown in FIGS. 2 and 3. The composite assembly includes a plurality of driver fuel elements 28 and a plurality of breeder fuel elements 30. The driver elements 28 initially comprise fissile enriched nuclear fuel as well known in the art. The breeder elements 30 initially comprise primarily fertile nuclear fuel, also well known. The type of fuel cycle, fissile enrichment, and overall utilization of nuclear fuel, including mixed oxide fuels, can be varied to most effectively use the composite fuel assembly in a given reactor. As will be noted, however, only a single enrichment of fissile driver fuel need be utilized throughout any given complete core.

The driver 28 and breeder 30 elements are elongated coextending members, preferably of cylindrical cross section, although other geometric configurations are also possible. Each element comprises nuclear fuel, typically in cylindrical pellet 32 form (FIG. 3), enclosed in an hermetically sealed metallic generally tubular cladding 34. The fuel elements 28, 30 are, in a preferred embodiment, enclosed in an open ended thin-walled metallic duct 36 through which the reactor coolant flows in direct contact with the outer surface of the fuel elements. The elements 28, 30 are affixed within the duct 36 in a regular geometric array through a guide rail 38 which matingly receives the lower portion of hanger pins 40 affixed at their upper portion to a fuel element extension 42. Although this exemplary reactor system is based upon ducted fuel assemblies, the benefits derived from a composite type fuel assembly can also be achieved with other fuel assembly types.

As shown best in FIG. 2, the breeder elements 30 are of larger cross section than the driver elements 28, are symmetrically oriented within the entire fuel element rod bundle, and are each laterally bounded by a subplurality 44 of driver elements. A selected subplurality 44 of driver elements is shown by the dotted line. It will now be apparent that the composite fuel assembly 20 allows modification of the effective fuel enrichment of a given assembly merely by varying the relative quantity and geometric relation of the driver and breeder elements. A singular fuel enrichment can therefore be incorporated in all of the driver elements within an assembly and also an entire core. Varying the number of driver elements accordingly varies the effective enrichment of the assembly. The core can be provided with a plurality of radial regions 46, for example 46a through 46e (FIG. 4), of differing effective enrichment, while maintaining a constant actual fissile fuel enrichment. The resultant benefits in fabrication cost, quality assurance and reliability are significant.

Each driver fuel element 28 is further provided with means for spacing the element from its laterally adjacent components. These adjacent components include other driver elements 28, breeder elements 30, and, at the fuel bundle periphery, the inner side of the duct 36. The spacing means can include wire wraps 48 (FIGS. 2 and 3), or alternatively a grid structure in an open-lattice assembly. The wires are all preferably wrapped with a common pitch. It will be recognized that the preferred wire wrap also advantageously contributes to fluid mixing within an assembly, and alternative means for mixing, such as projecting vanes, can be included in alternative assembly structures.

It will be evident to those skilled in the art of core design that the disclosed composite fuel assembly 20 provides for a distinct leveling of radial power distribution and thermal gradients across both an individual assembly and a complete core. Although the relative quantity and orientation of driver and breeder elements within a fuel assembly can be varied, a centrally located breeder element is preferred. Previous fuel assembly design, including substantially similarly sized fuel elements, results in a generally peaking power density at the assembly axial centerline which decreases as it approaches the peripheral rods where neutron flux is lessened and coolant flow is greater. This can be counteracted by designs including varying fuel enrichments and complex flow controls such as a plurality of orifices. Comparatively, the enlarged breeder elements 30 of the composite assembly, particularly those positioned along the duct central axis, provide a larger than normal coolant flow channel about each breeder element, thereby providing additional local coolant mass flow. This reduces the bundle centerline-to-periphery thermal gradient. The increased coolant mass flow is maintained even through the power output will shift from the driver elements to the breeder elements with core burnup, which shift can further enhance minimum radial gradients.

It will also be noted from FIGS. 2 and 3 that the breeder elements 30, each being surrounded by a subplurality 44 of driver elements 28 each having a wire wrap 48, are spaced and laterally supported by the driver element wraps 48. In the preferred hexagonal triangular-pitched arrangement shown, each breeder element is supported at twelve peripheral locations along its length, although supported at six peripheral locations in the "pinch plane" of FIG. 2. The pinch plane is that lateral plane occurring at periodic intervals along the assembly vertical axis at which a subplurality of the wire wraps 48 contact the assembly duct. In addition to the reduced thermal gradient across the fuel element bundle and duct, resulting in reduced thermally induced stresses, it is believed that the absence of wire wraps about the breeder elements 30 will further reduce stresses imposed by the bundle upon the duct's walls. Elimination of the wire wraps on breeder elements reduces the stiffness of the bundle at the pinch plane. Under the influence of radiation and thermal cycling throughout the assembly life, it is recognized that the fuel elements have a tendency to bow or bend, imposing stresses and a bending influence upon the duct. An increase in bundle stiffness is believed to increase the bending influence of the bundle upon the duct and, accordingly, the decreased stiffness provided by the absence of breeder element wire wraps is believed to decrease the bending influence of the bundle upon the duct. Preliminary investigation therefore concludes that due to the reduced thermal gradients and also the believed reduced bending influence, the duct wall thickness can be reduced by ten to twenty percent compared to prior art fuel assemblies. It is further noted that the increased cross section of the breeder elements contributes rigidity to the element bundle. Thus, a designer utilizing a composite assembly can vary within the required parameters of a given core and reactor the components' sizing, spacing, and fluid flow to achieve desirable neutronic and mechanical operation. A relatively large diameter breeder element, contributing to bundle rigidity, can be utilized to counteract the reduced stiffness caused by wire wrap elimination on the breeder element, if desired.

Exemplary geometric parameters for the composite fuel assembly shown in FIGS. 2 and 3, having thirteen breeder elements and 126 driver elements, are presented in Table I.

TABLE I

| Hexagonal duct wall thickness | 0.120 inches |
| --- | --- |
| Distance across outer flats | 4.575 inches |
| Breeder element outside diameter | 0.640 inches |
| Driver element outside diameter | 0.230 inches |
| Wire wrap diameter | 0.076 inches |

Figure 5:
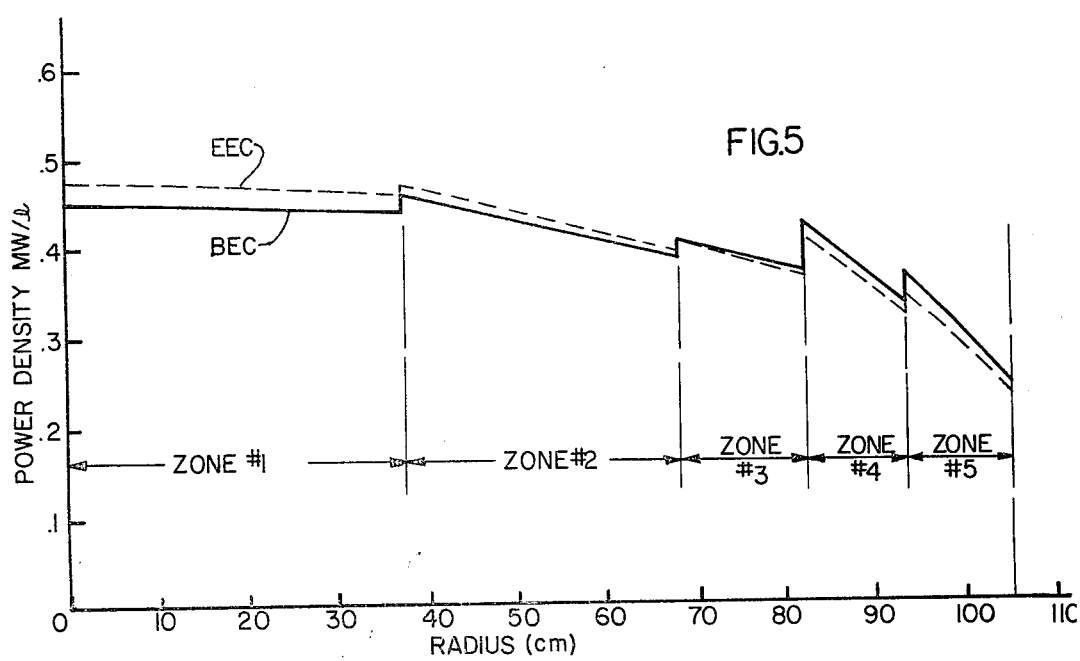
FIG. 5 is a graph plotting distance from the core center line, in centimeters (X axis) versus core power density, in megawatts per liter (Y axis), for a composite core at the beginning of equilibrium cycle and end of equilibrium cycle.
Figure 4:
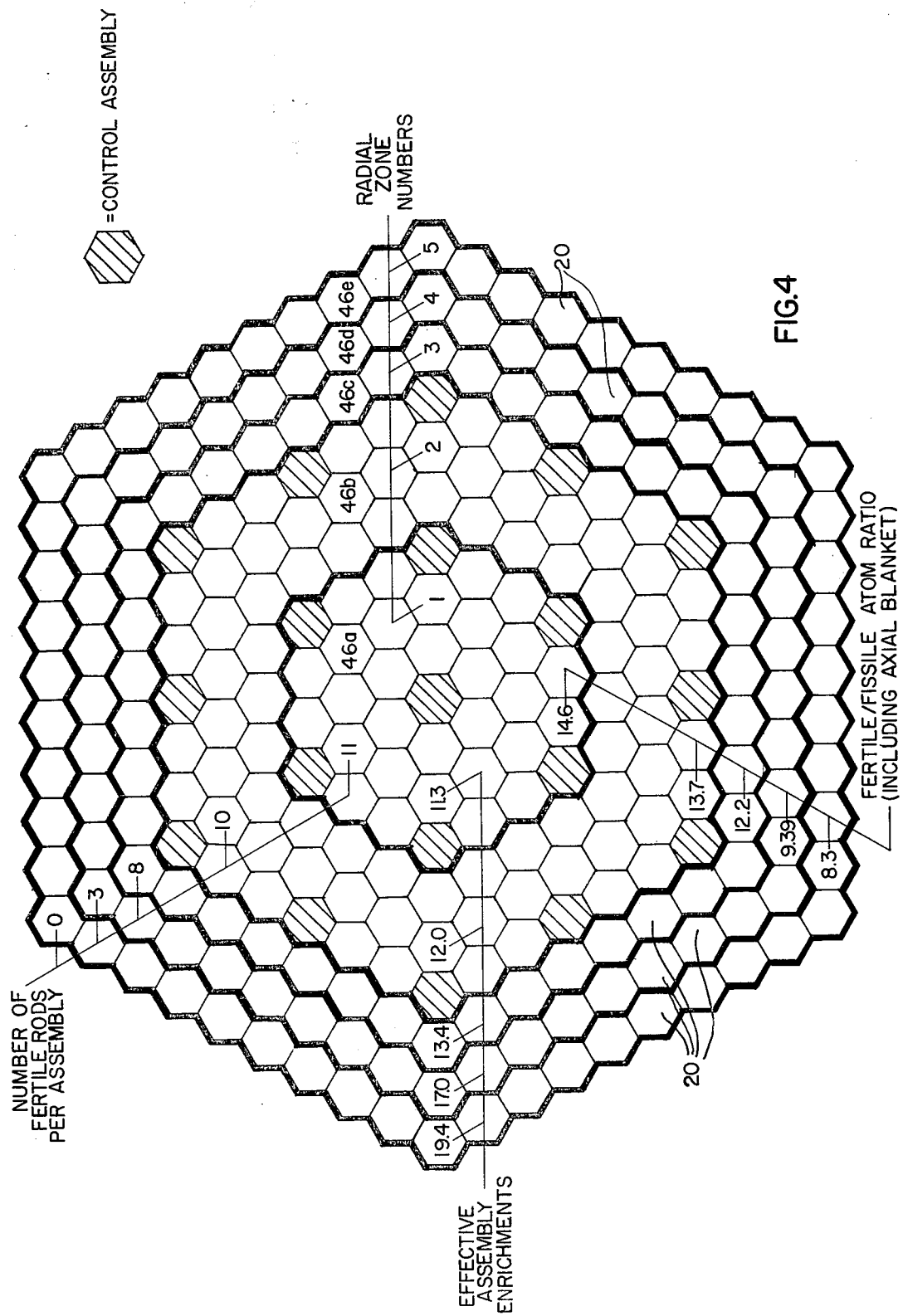
FIG. 4 is a plan view of an exemplary composite nuclear core in accordance with this invention.

FIG. 4 shows an illustrative composite core arrangement including five distinct radial regions which, as a result of a varying number of breeder elements 30 among regions, provide varying effective assembly enrichments although all of the driver elements 28 are of substantially identical enrichment. The figure identifies the radial zone number, the fertile-to-fissile atom ratio including an upper and lower axial blanket, the effective enrichment of each assembly in the five zones, and the number of fertile rods per assembly in each zone. It is evident from the figure that with increasing radius from the center of the core the number of fertile rods per assembly progressively decreases, the fertile-to-fissile atom ratio decreases, and the effective enrichment increases. The positions of nineteen control assembly locations, for receiving rectilinearly insertable control rods, are also shown in the figure FIG. 5 shows the calculated power density across the composite core of FIG. 4. As shown, a substantial leveling of power density can be achieved through utilization of composite fuel assemblies 20. It is to be understood that a greater leveling effect than shown can be achieved through optimization design, particularly at the core periphery. A greater leveling effect could also be provided by utilizing flow orifices, for example, merely in the outer zone. FIG. 5 also graphically shows the relatively small power swing which will occur in the exemplary composite assembly core from the beginning of an equilibrium cycle (BEC) to the end of an equilibrium cycle (EEC). The power profile is always between the BEC and EEC curves as shown. In the absence of complex coolant flow control, this swing is directly related to the coolant assembly outlet temperature. It will be apparent to those skilled in the art that the magnitude of this swing is significantly smaller than that of either heterogeneous or homogeneous type cores. Accordingly, the composite assembly core has the potential for substantially minimizing orifice or other flow control means and the thermally induced loads among adjacent ducts and upon core restraint structures. Similarly, the mixed-mean outlet temperature change from any single assembly during core life is significantly reduced, alleviating thermal cycling among ducts of adjacent assemblies. In the exemplary composite core, a Zone 1 assembly produces 4.396 megawatts per assembly at the beginning of the equilibrium cycle and increases to 4.610 megawatts per assembly at the end of the equilibrium cycle. Thermally, however, an increase in mixed-mean outlet temperature of only 12.8 Fahrenheit degrees would occur for an assembly flow rate of 190,000 pounds-mass of sodium per hour. Similarly, the heat generation rate of a Zone 4 assembly decreases from 4.170 megawatts. This corresponds to a drop in the mixed mean outlet temperature of approximately 12.2 Fahrenheit degrees for an exemplary assembly sodium flow rate of 190,000 pounds-mass per hour. It is therefore seen that a composite fuel assembly and reactor core in accordance with this invention provides numerous advantages, including those related to neutronic efficiency, thermal stresses, and resultant structural requirements. It is to be understood that while the invention has been taught primarily by specific example, multiple alternates are possible, and, within the scope of the appended claims, the invention may be practiced other than as specifically described.

We claim:

1. In a liquid metal cooled breeder nuclear reactor, an improved core comprising a plurality of vertical coextending fuel assemblies arranged in a predetermined lateral array so as to approach the configuration of a right circular cylinder, each said assembly including a thin-walled metallic polygonal duct and a plurality of parallel coextending elongated fuel elements closely arranged within said duct in a bundle of substantially the same cross-sectional shape as said duct, said fuel elements including a plurality of breeder elements and a plurality of enriched fissile fueled driver elements, each said driver element having a peripherally wound wire spacer, said breeder elements being of larger transverse cross section than said driver elements and each laterally bounded and radially supported by said spacers of a subplurality of said driver elements, said spacers of said subplurality being contiguous with said breeder element, said peripherally wound wire spacers being only on said driver elements, said breeder elements being radially supported solely by said spacers of said driver elements each said driver element of said core being of the same fissile enrichment, the number of said breeder elements in each of said assemblies of said core varying in a predetermined decreasing amount from the assemblies in a radial central region of said core to a radial peripheral region of said core, the number of said driver elements in each of said assemblies varying in a predetermined increasing amount from the assemblies in a radial central region of said core to a radial peripheral region of said core.

* * * * *